United States Patent Office 2,761,852
Patented Sept. 4, 1956

2,761,852

BASIC POLYUREAS

Wolfgang Lehmann, Leverkusen-Bayerwerk, and Heinrich Rinke, Leverkusen, Germany, assignors to Farbenfabriken Bayer Aktiengesellschaft, Leverkusen, Germany, a corporation of Germany No Drawing. Application July 24, 1951,
Serial No. 238,403

Claims priority, application Germany July 24, 1950

11 Claims. (Cl. 260—29.2)

The present invention relates to basic polymers and more particularly to basic polycarbamides and polyurethanes.

Although it was known to produce polycarbamides (polyureas) or polyurethanes by the reaction of diprimary diamines with diisocyanates or glycol-bis-chlorocarbonates, the reaction could not be applied to diamines having in addition to their primary amino groups one or several secondary amino groups, since both the diisocyanates and the bis-chlorocarbonates react also with the secondary amino groups, thus excluding the possibility of obtaining linear highly polymeric products.

It is an object of the invention to provide a process by which these disadvantages can be avoided. Another object is to provide novel basic polycarbamides or polyurethanes having valuable properties for many industrial applications and especially for textile printing. Other objects will become apparent as the following specification proceeds.

We have found, that highly molecular linear basic polyureas and polyurethanes are obtained by reacting in the presence of a lower aliphatic alcohol a diprimary aliphatic diamine containing in the carbon chain one or several secondary amino groups with a diisocyanate or a glycol-bis-chlorocarbonate.

Amines dissolve in alcohols with evolution of heat. It is assumed that the molecules of the alcohol are added to the amine with the formation of oxonium compounds of the following kind.

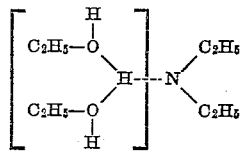

For instance, it could be ascertained that diethylene triamine adds 10 mols of methanol or eight mols of ethanol.

The invention is based on the discovery that addition products of diamines with alcohols, readily obtainable by dissolving a diamine in alcohol, react much more slowly with diisocyanates or bis-chlorocarbonates of glycols than the free diamines. The speed of reaction of these addition products with the diisocyanates or bis-chlorocarbonates is, however, substantially higher than that of the alcohol, so that side reactions, which result in stopping the growth of the chains and in cross-linking are not observed. Further it has been found, that the addition of the alcohol to the secondary amino group is so stable, that only the primary amino groups react with the formation of highly polymeric compounds.

The process of this invention easily yields basic polyureas or polyurethanes with molecular weights, which permit for instance their melt spinning or casting into films from the usual solvents.

For the production of linear super polymers the reactants are mixed in about equimolecular proportions in dilution, in order to ensure, that the reaction temperature remains moderate in spite of the strongly exothermic character of the reaction. As alcohols those are preferred in which the reactants are soluble, for instance the lower aliphatic alcohols like ethanol. A part of the alcohol may be replaced by other solvents, such as chlorobenzene, benzene, tetrahydrofurane etc.

Owing to the comparatively high speed of reaction the process may easily be carried out continuously. It is also possible to employ the reaction for enhancing the chain length of basic polyamides or polyoxamides of low degree of polymerisation by reacting the same in alcoholic solution with diisocyanates or glycol-bis-chlorocarbonates.

The basic polymers, which are soluble in dilute acetic acid may be cross-linked with diethyloxalate, formaldehyde or compounds yielding formaldehyde upon decomposition, diketenes, diisocyanates, hexahydro-1.3.5-triacrylyl-s-triazine, by which reaction they are rendered insoluble. By suitable selection of the kind and amount of the cross-linking agent products of a varying degree of cross linking, which are more or less capable of swelling, may be obtained.

The products of the invention are suited to a number of industrial applications. Thus, they may be used for rendering textile fibers dyeable with acid dyestuffs or water repellent, or they may be employed as binders in pigment printing. For this purpose they are preferably used in the form of their salts in aqueous solution. The solution of the basic polymer in a dilute acid, for instance, acetic acid, is mixed with a pigment paste containing a cross-linking agent and then brought to the necessary thickness by the addition of water and the usual thickeners. It is possible to adjust the production of the polymers in such a manner that the salts of the polymer yield so viscous an aqueous solution that the addition of a thickener can be omitted. Mixtures of this kind constitute stable printing pastes of favorable consistency. For carrying out the printing, the paste is printed on a surface in the usual manner. In order to start the reaction between the polymer and the cross-linking agent the printed surface is thereupon heated. Prints are obtained which excel by their depth and brilliancy of color, good fastness to rubbing during washing and a very good fastness to boiling in soda and to light.

It is sometimes of advantage to carry out the production of the basic polymer in the presence of a pigment. The pigmented basic polymers may be employed for pigment printing after dissolving in aqueous acetic acid, adding the cross-linking agent and other suitable auxiliaries. Prints obtained from such polymers possess an especially good fastness to rubbing.

Example 1

A freshly prepared solution of 168 grams of hexamethylene-diisocyanate in 3.5 liters of methanol are added at room temperature to a solution of 131 grams of dipropylenetriamine in 4.5 liters of methanol. After four hours the clear solution is freed from alcohol, 299 grams of the basic polyurea remain as a residue having a melting point of 114–117.5° C. and a viscosity number $z\eta$ of $70 \times 10^{-3}$.

The viscosity number is defined as $$z\eta = \frac{\eta_{\text{rel.}} - 1}{c}$$

wherein $\eta_{\text{rel.}}$ is the relative viscosity and $c$ is the concentration in grams per liter.

The polymer is easily soluble in ethanol and dilute acetic acid and may be cross-linked with cross-linking agents, for instance ethyloxalate and/or diisocyanates.

Example 2

A solution of 167 grams of hexamethylene-diisocyanate in 3 liters of tertiary butylalcohol is added at 0° C. to the solution of 202 grams of spermin, diaminodipropyltetramethylenediamine of the formula $$NH_2(CH_2)_3NH(CH_2)_4NH(CH_2)_3NH_2$$

in 5 liters of tertiary butyl alcohol (1 mol hexamethylenediisocyanate on 0.995 mol spermin). After five hours the clear solution is subjected to distillation. A polymer remains which is hygroscopic and shows a viscosity number of $31 \times 10^{-3}$. It is very easily soluble in dilute acetic acid and ethanol.

Example 3

An ice-cooled solution of 420 grams of hexamethylenediisocyanate in 5 liters of isobutylalcohol is added to an ice-cooled solution of 51.5 grams of diethylenetriamine and 232 grams of hexamethylenediamine (½ mol:2 mol) in 6 liters of isobutylalcohol. The polyurea separates turbidly after eight seconds. After ten hours it is sucked off and the polymer dried in vacuo at 80–100° C. Its melting point is 267–270° C., viscosity number $z\eta = 118 \times 10^{-3}$.

Example 4

The alcoholic solutions of 103 grams of diethylenetriamine, 79 grams of pyridine in 4 liters of crude ethanol and 215 grams of tetramethyleneglycol-bis-chlorocarbonate of the formula $$Cl.CO.O.(CH_2)_4.O.CO.Cl$$

in 2 liters of crude ethanol are mixed as quickly as possible. After three seconds the solution becomes turbid. A basic polyurethane separates as a hydrochloride; after two hours it is sucked off, washed with ethanol and dried at 90–100° C. The hydrochloride of the polymer shows a viscosity number of $48 \times 10^{-3}$ in concentrated sulfuric acid and a melting point of 202–204° C. The basic polyurethane may be liberated from the aqueous solution of the hydrochloride by the addition of alkali. It may be cross-linked with the usual cross-linking agents as such or after spinning and cold-drawing and may thus be rendered insoluble.

Example 5

A solution in alcohol of 243 grams of hexamethyleneglycol-bis-chloro-carbonate is dropped within 15 minutes into a cooled solution of 103 grams of diethylenetriamine, 79 grams of pyridine and 5 liters of ethanol. When about 80 per cent of the chlorocarbonate have been dropped in, the first portions of the basic polyurethane separate as hydrochloride. The solution is left to stand for 30 minutes and then the residue sucked off and dried in vacuo at 80–100° C. Its viscosity number $z\eta$ is $70 \times 10^{-3}$, its melting point 203–205.5° C.

Example 6

The solution of 0.9 mols of diethyloxalate (131.3 grams in one liter of ethanol) is added to a solution of 1 mol of spermin (202 grams in 5 liters of ethanol). After 45 minutes a freshly prepared solution of 0.1 mol hexamethylenediisocyanate (16.8 grams) in 100 ccs. of alcohol is added. The polymer begins to separate after 5 hours. 24 hours after the addition of the diisocyanate solution the residue is sucked off, washed with alcohol and dried in vacuo at 80° C. The yield amounts to 116 grams. The melting point of the polymer is 146–148° C., the viscosity number $z\eta = 45 \times 10^{-3}$. The polymer dissolves easily in dilute acetic acid.

Example 7

The solution of 0.1 mol of hexamethylenediisocyanate (16.8 grams) in 100 ccs. of ethanol are added to a solution of 1 mol (202 grams) of spermin in 5 liters of ethanol. After 45 minutes a solution of 0.9 mol of diethyloxalate (131 grams) in one liter of ethanol is added. Five hours later the polymer begins to separate. It is sucked off after storing for a day, washed with ethanol and dried in vacuo at 80–90° C. The yield amounts to 95 grams, the melting point is 154–156° C., the viscosity number $z\eta$ is $62 \times 10^{-3}$.

Example 8

A freshly prepared cooled solution of 9.33 kg. of hexamethylenediisocyanate and 11 liters of ethanol are gradually added inside 10 minutes to a cooled solution of 0.281 kg. of diethylenetriamine, 7.5 kg. of $\gamma.\gamma'$-diaminopropyl-methylamine and 110 liters of ethanol. The temperature in the reaction mixture rises from $-10°$ C. to $+15°$ C. The mixture is stirred for an hour at room temperature whereafter the basic polyurea, which has precipitated in a finely dispersed state, is sucked off or recovered by centrifuging. The basic polyurea is dried for one day in vacuo at 65° C. The yield of moist polyurea amounts to 36.5 kg., of dried polyurea 16.4 kg., which is 96 per cent of the theoretical. The viscosity number is $400 \times 10^{-3}$, the melting point 208–210° C. The filtrate, which contains low molecular weight compounds may be employed without intermediate distillation as a solvent for the next batches. The yield can thus be increased to 99 per cent of the theoretical. The basic polyurea is easily soluble in dilute acetic acid and yields a clear, viscous solution. A 10 per cent solution of its acetate shows a viscosity of 620 centipoise at 25° C.

The basic polyurea can be employed for pigment printing in the following manner:

400 parts by weight of a 10 per cent solution of the acetate of the basic polyurea
150 parts by weight of a 15 per cent copperphthalocyanine paste
70 parts by weight of methylcellulose (70:1000)
15 parts by weight of hexahydro-1.3.5-triacrylyl-s-triazine
365 parts by weight of water ―――
1000 parts by weight The mixture described above yields a stable printing paste of good consistence which may easily be rinsed with water from the printing rollers or film printing matrices. The printing paste is printed in the usual manner on cotton fabrics or rayon staple fabrics. For after-treatment the print is predried at 40–70° C.; subsequently prints on cotton are heated to 100–110° C., prints on rayon staple or rayon are heated to 120–130° C.

The prints on cotton, rayon staple or rayon have good depth and brilliancy of color, very good fastness to rubbing during washing, very good fastness to boiling in soda and to light.

Example 9

A cooled freshly prepared solution of 171.4 grams (1.02 mol per cent) of hexamethylenediisocyanate in 200 ccs. of ethanol is introduced inside 10 minutes into a cooled solution of 5.05 grams of spermin (2.5 mol per cent), 141.2 grams of $\gamma.\gamma'$-diaminopropylmethylamine (97.5 mol per cent) in two liters of ethanol. After 7 hours the polymer begins to separate. The mixture is stirred for another hour and the basic polyurea precipitated is sucked off, dried for some hours in vacuo at 65–70° C. in order to remove the solvent. The yield amounts to 301 grams or 95 per cent of the theoretical. The melting point is 211–213° C., the viscosity number $z\eta$ is $442 \times 10^{-3}$. The basic polyurea easily dissolves in dilute acetic acid and yields a highly viscous solution.

If under equal conditions 3 mol per cent more of hexamethylenediisocyanate are employed, a polymer of the viscosity number $z\eta = 557 \times 10^{-3}$ is obtained. This polymer is also still easily soluble in dilute acetic acid but the solutions of its acetate are substantially more viscous than those of the polymer having the viscosity number $z\eta = 442 \times 10^{-3}$. The 10 per cent solution is so viscous that a glass rod stands therein.

The polyurea thus obtained may be used as a pigment binder in padding according to the following formula:

100 grams of a 10 per cent aqueous solution of the acetate of the basic polyurea are diluted with
10 grams of methylcellulose (70:1000) and
200 grams of water. Thereafter
5 grams of hexamethylenetetramine and
2–4 grams of a pigment paste are added and the whole diluted with water.

After padding the fabric is dried and subsequently heated to 100–120° C. for ten minutes.

*Example 10*

A cooled freshly prepared solution of 171.4 grams (1.02 mol. per cent) of hexamethylenediisocyanate in ethanol is introduced inside 10 minutes while stirring into a cooled solution of 26.2 grams of dipropylenetriamine (0.2 mol per cent) and 116 grams of $\gamma.\gamma'$-diaminopropyl-methylamine (0.8 mol per cent) in two liters of ethanol. After one hour the basic polyurea formed is sucked off in order to remove the solvent. The polymer is heated in vacuo for some hours to 60–70° C. The yield amounts to 95 per cent of the theoretical. The viscosity number is $z\eta = 242 \times 10^{-3}$, the melting point 206–209° C.

The basic polyurea thus obtained may be employed as a binder in pigment printing according to the following formula:

300 parts by weight of the acetate of the basic polyurea
150 parts by weight of a 20 per cent aqueous red pigment dyestuff paste
20 parts by weight of hexahydro-1.3.5-triacrylyl-s-triazine
530 parts by weight of water 1000 parts by weight The after-treatment of the finished print is carried out as in Example 9. The prints are of an even red color and are very fast to light and washing on cotton or rayon staple.

*Example 11*

The mixture of 135 parts by weight of powdered Hansa Yellow 10 G, 5.06 parts by weight of diethylenetriamine, 135 parts by weight of $\gamma$-$\gamma'$-diaminopropylmethylamine and two liters of ethanol is stirred for two hours at room temperature. The mixture is cooled to —10° C. and a freshly prepared cooled solution of 168 parts by weight of hexamethylenediisocyanate in 200 parts by weight of ethanol is dropped in within ten minutes. After stirring for another hour the polymer is sucked off and dried for some hours in vacuo at 70° C. The yield amounts to 95 per cent, the viscosity number is $z\eta = 860 \times 10^{-3}$.

The product dissolves easily in dilute acetic acid and yields a very viscous solution in which the pigment is extremely finely dissolved. For pigment printing a solution of 5 per cent of the basic polyurea is prepared:

148 grams of the pigmented polyurea are mixed with
22 grams of glacial acetic acid and
1830 grams of water.

400 grams of this solution
100 grams of methylcellulose (70:1000)
15 grams of hexahydro-1.3.5-triacrylyl-s-triazine
485 grams of water yield 1000 grams of a printing paste which is printed as described in Example 9. On cotton, rayon staple, or rayon, prints are obtained, which not only have good depth and brilliancy of color, very good fastness to rubbing during washing and a very good fastness to soda and light, but also are extremely fast to rubbing.

We claim:
1. The polyurea of claim 9, in which diethylenetriamine is replaced by dipropylenetriamine.
2. The polyurea of claim 9, in which diethylenetriamine is replaced by diaminodipropyltetramethylene diamine.
3. The process claimed in claim 11, wherein the aliphatic alcohol is ethanol.
4. The process claimed in claim 11, wherein the aliphatic polymethylene diisocyanate is hexamethylenediisocyanate.
5. In the process claimed in claim 11 the step which comprises adding a pigment to the reaction mixture.
6. A basic polyurea containing recurring

$NHCONH(CH_2)_2NH(CH_2)_2NHCONH(CH_2)_6$ groups and being soluble in dilute aqueous acids.
7. A basic polyurea containing recurring $NHCONH(CH_2)_3NH(CH_2)_3NHCONH(CH_2)_6$ groups and being soluble in dilute aqueous acids.
8. A basic polyurea containing recurring $NHCONH(CH_2)_3NH(CH_2)_4NH(CH_2)_3NHCONH(CH_2)_6$ groups and being soluble in dilute aqueous acids.
9. A polyurea obtained by reacting in a monohydric lower aliphatic alcohol, a mixture of diethylene triamine and gamma, gamma-diaminopropylmethylamine with about equimolecular proportions of hexamethylene diisocyanate.
10. An aqueous textile printing paste comprising a pigment and as a binder the acetic acid salt of the polymer of claim 9.
11. The process which comprises reacting in a monohydric lower aliphatic alcohol, a diprimary aliphatic diamine containing in its molecule additionally at least one secondary amino group with an aliphatic polymethylene diisocyanate.

References Cited in the file of this patent

UNITED STATES PATENTS

| | | |
|---|---|---|
| 2,292,443 | Hanford | Aug. 11, 1942 |
| 2,356,079 | Nelles et al. | Aug. 15, 1944 |
| 2,660,575 | Jones et al. | Nov. 24, 1953 |

FOREIGN PATENTS

| | | |
|---|---|---|
| 888,938 | France | Dec. 27, 1943 |
| 951,486 | France | Oct. 26, 1949 |